United States Patent
Rapo

(10) Patent No.: US 8,676,996 B2
(45) Date of Patent: *Mar. 18, 2014

(54) SYSTEM AND METHOD FOR VARIABLE TIME SCALE FOR MULTI-PLAYER GAMES

(75) Inventor: Andrew Rapo, Studio City, CA (US)

(73) Assignee: Disney Enterprises, Inc., Burbank, CA (US)

(*) Notice: Subject to any disclaimer, the term of this patent is extended or adjusted under 35 U.S.C. 154(b) by 740 days.

This patent is subject to a terminal disclaimer.

(21) Appl. No.: 12/586,690

(22) Filed: Sep. 24, 2009

(65) Prior Publication Data

US 2011/0072094 A1    Mar. 24, 2011

(51) Int. Cl.
    *G06F 15/16*    (2006.01)
(52) U.S. Cl.
    USPC .............. 709/228; 709/203; 463/39; 463/40; 463/42
(58) Field of Classification Search
    None
    See application file for complete search history.

(56) References Cited

U.S. PATENT DOCUMENTS

| | | | |
|---|---|---|---|
| 6,699,125 B2 * | 3/2004 | Kirmse et al. | 463/42 |
| 7,240,093 B1 * | 7/2007 | Danieli et al. | 709/205 |
| 7,288,028 B2 * | 10/2007 | Rodriquez et al. | 463/42 |
| 7,490,169 B1 * | 2/2009 | Ogdon et al. | 709/248 |
| 7,695,370 B2 * | 4/2010 | Liu et al. | 463/42 |
| 7,803,054 B1 * | 9/2010 | Ogus et al. | 463/42 |
| 7,843,876 B2 * | 11/2010 | Holt et al. | 370/329 |
| 8,024,434 B2 * | 9/2011 | Hutcheson et al. | 709/221 |
| 8,069,258 B1 * | 11/2011 | Howell | 709/230 |
| 8,082,501 B2 * | 12/2011 | Leahy et al. | 715/706 |
| 2010/0241692 A1 * | 9/2010 | Klee et al. | 709/203 |

* cited by examiner

*Primary Examiner* — Mohamed Ibrahim
(74) *Attorney, Agent, or Firm* — Farjami & Farjami LLP

(57) ABSTRACT

There is provided a system and method for facilitating variations in a time scale for a shared environment. There is provided a method for use by a processor of a server for facilitating variations in a time scale for a shared environment, the method comprising receiving a message generated by a first client of a plurality of clients in response to a variation in the time scale, for rendering the shared environment, caused by a user of the first client, and sending a second message to a second client of the plurality of clients in response to receiving the first message to communicate the variation in the time scale caused by the first client, so as to cause the second client to render the shared environment approximately synchronously in accordance with the variation in the time scale.

20 Claims, 3 Drawing Sheets

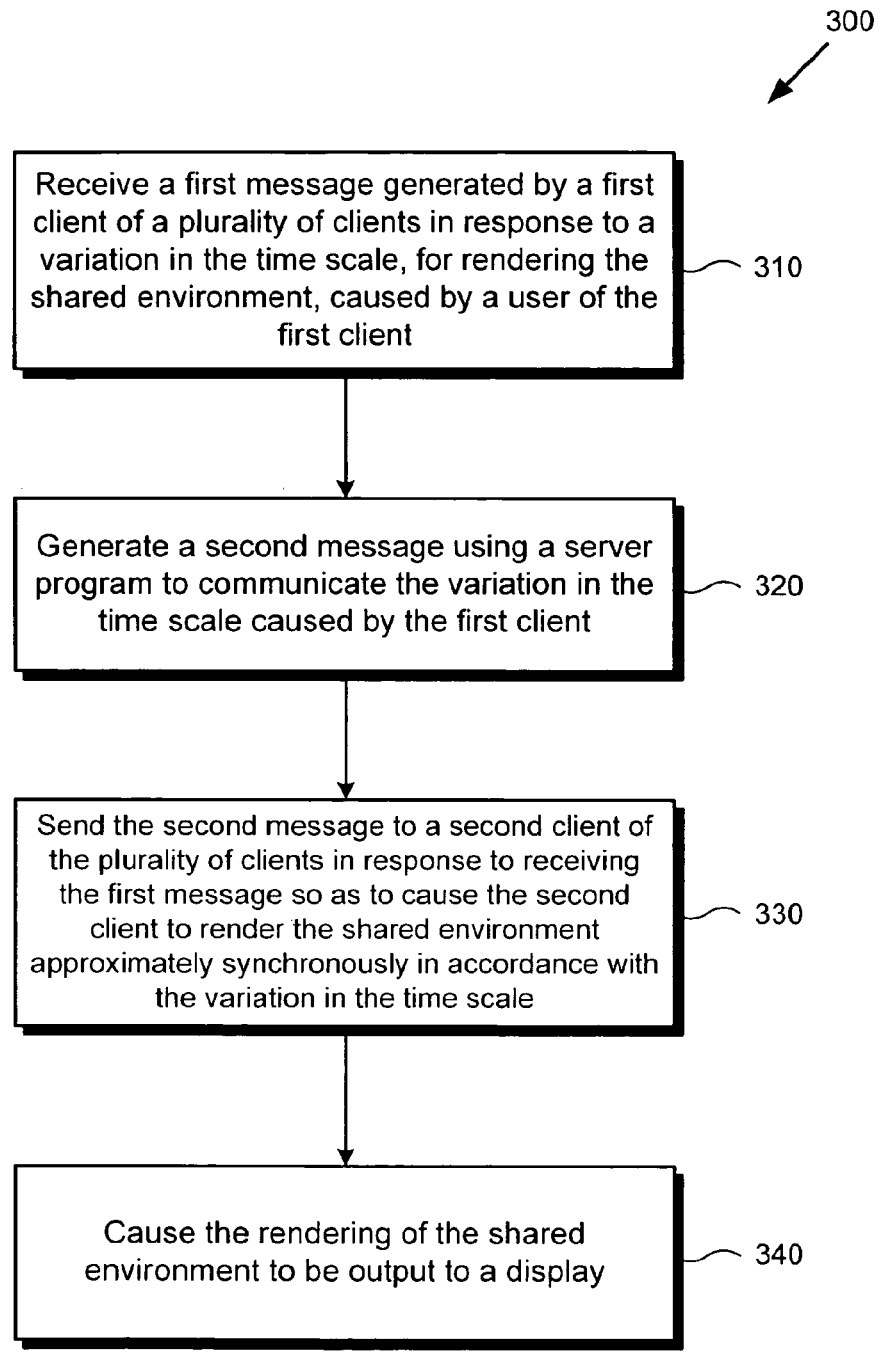

SYSTEM AND METHOD FOR VARIABLE TIME SCALE FOR MULTI-PLAYER GAMES

BACKGROUND OF THE INVENTION

1. Field of the Invention

The present invention relates generally to interactive entertainment. More particularly, the present invention relates to multi-player interactive entertainment.

2. Background Art

Interactive entertainment such as video games often reward fast reflexes and quick thinking. For example, shooting games reward players that can quickly recognize and accurately aim at targets, racing games reward players that can quickly react to changing course conditions and rival vehicles, and puzzle games reward players that can analyze the situation and plan several steps ahead. Often, video games are rendered more enjoyable by playing them competitively or cooperatively in a multi-player online setting. In this manner, users can enjoy the thrills of competing in ranked matches and the camaraderie of struggling towards a common goal.

Video games often utilize fantastic fictional world settings based on popular media such as movies, books, comics and graphic novels. Often, these world settings may feature action elements that may readily translate into a viable video game concept. However, to provide greater dramatic effect, these action elements may tend to favor high-speed and over-the-top presentations. For example, various world settings might feature characters with superhuman or enhanced cybernetic reflexes that allow players to adapt to extreme conditions. These world constructs may make it difficult to faithfully convert such high-speed action elements into a video game accommodating the reaction times of an average video game player. Moreover, using a multi-player online setting creates technical issues that need to be addressed, such as network latency.

Accordingly, there is a need to overcome the drawbacks and deficiencies in the art by creating a way to integrate high-speed action elements in a multi-player online interactive setting that can still accommodate to the reaction times of an average video game player.

SUMMARY OF THE INVENTION

There are provided systems and methods for facilitating variations in a time scale for a shared environment, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 shows a flowchart describing the steps, according to one embodiment of the present invention, by which a processor of a server can facilitate variations in a time scale for a shared environment.

DETAILED DESCRIPTION OF THE INVENTION

The present application is directed to a system and method for facilitating variations in a time scale for a shared environment. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
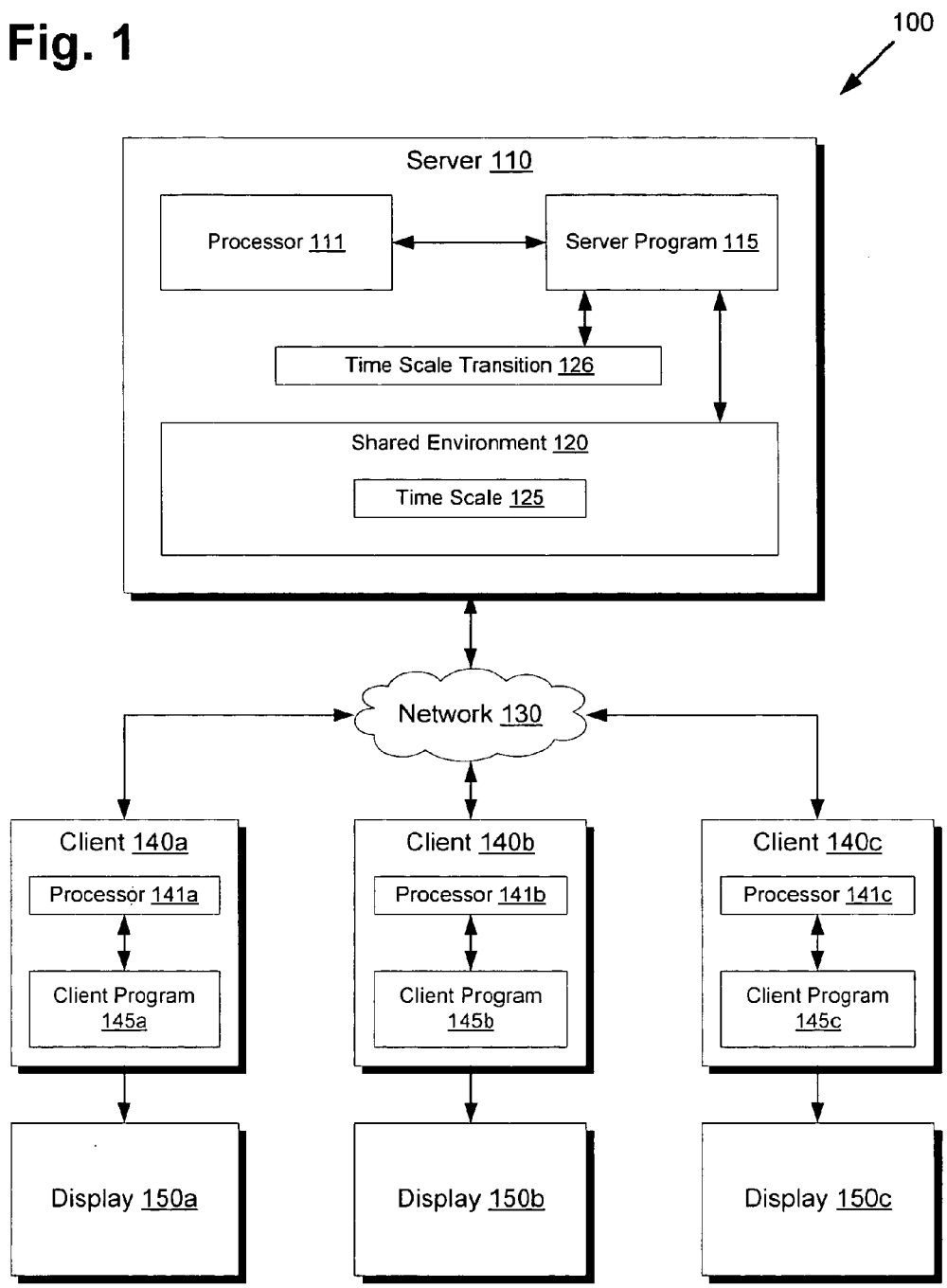
FIG. 1 presents a server facilitating variations in a time scale for a shared environment, according to one embodiment of the present invention.

FIG. 1 presents a server facilitating variations in a time scale for a shared environment, according to one embodiment of the present invention. Diagram 100 of FIG. 1 includes server 110, network 130, clients 140a-140c, and displays 150a-150c. Server 110 includes processor 111, server program 115, shared environment 120, and time scale transition 126. Shared environment 120 includes time scale 125. Client 140a includes processor 141a and client program 145a. Client 140b includes processor 141b and client program 145b. Client 140c includes processor 141c and client program 145c.

FIG. 1 presents an overview of an exemplary network for supporting an online interactive application. As shown in FIG. 1, clients 140a-140c each connect to server 110 via network 130. Network 130 may comprise a publicly accessible network such as the Internet. Processor 111 of server 110 may execute server program 115 to provide access to shared environment 120. As shown in FIG. 1, shared environment 120 includes time scale 125, which specifies the rendering speed of shared environment 120. Furthermore, server program 115 also has access to time scale transition 126, which specifies a particular method of applying variations in time scale 125. In alternative embodiments, client programs 145a-145c may have access to or otherwise generate time scale transition 126, which may then be provided to server program 115. Clients 140a-140c may each comprise, for example, a desktop or laptop computer, a game console, a mobile phone, a portable media player, or any other device capable of connecting to server 110 via network 130 and outputting video to displays 150a-150c, respectively. For example, as shown in FIG. 1, each of clients 140a-140c may be executing respective client programs 145a-145c using respective processors 141a-141c. Client programs 145a-145c may comprise, for example, a client program or a web browser that accesses and interfaces with server program 115 running on server 110. Clients 140a-140c may then render shared environment 120 according to time scale 125 for output on displays 150a-150c, which is observable by the users of clients 140a-140c.

Although only one server and three clients are depicted in FIG. 1, alternative embodiments may use several servers and support many more than three clients concurrently. Multiple servers may be provided for load balancing, optimum network locality, redundancy, and other reasons, whereas many clients may be connected concurrently to support massively multi-player online (MMO) gameplay. However, for reasons of clarity and simplicity, the network configuration shown in FIG. 1 shall be adopted for explanatory purposes.

Figure 2:
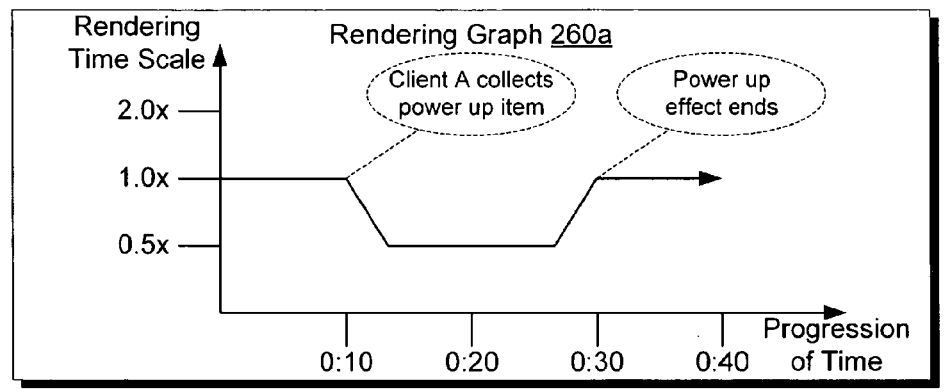
FIG. 2 presents rendering graphs showing variations in a time scale for a plurality of clients rendering a shared environment, according to one embodiment of the present invention.
Figure 2:
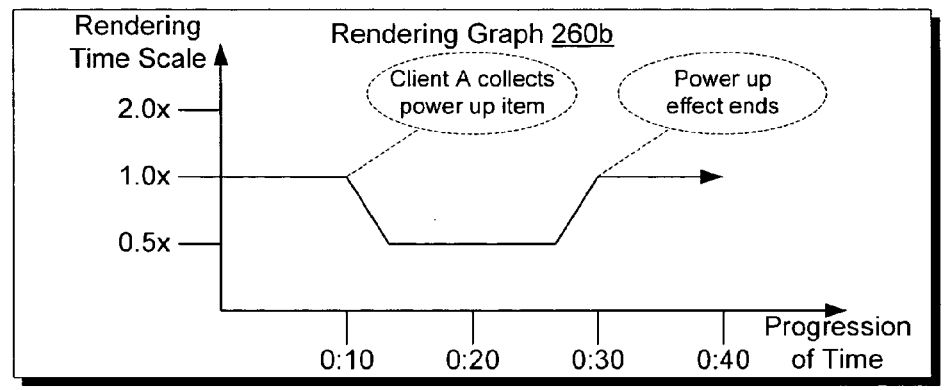
Figure 2:
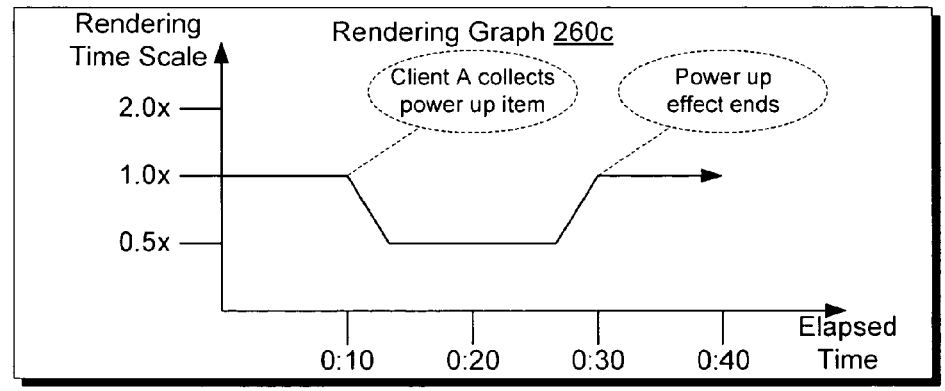

FIG. 2 presents rendering graphs showing variations in a time scale for a plurality of clients rendering a shared environment, according to one embodiment of the present invention. Diagram 200 includes rendering graphs 260a-260c, corresponding to time scale 125 as applied to shared environment 120 by client programs 145a-145c of FIG. 1, respectively.

In a scenario described by rendering graph 260a, as shown in FIG. 2, client A or client 140a in FIG. 1 collects a power up item at time 0:10. From time 0:00 until time 0:10, game time progresses normally at a 1.0× rendering time scale. After time 0:10, the power up item affects game time by gradually decreasing the rendering time scale from 1.0× to 0.5×, keeping the rendering time scale at 0.5× for a while, and then returning the rendering time scale back to 1.0× as the power up item effect ends at time 0:30. After time 0:30, game time again continues to progress normally at a 1.0× rendering time scale. In this manner, client 140a receives a "slow-motion" benefit where shared environment 120 is rendered and output to display 150a at mostly a 0.5× rendering speed, or half speed, allowing a user of client 140a to react more quickly to obstacles, rival clients, and other action elements. This may be of particular benefit for high-speed action genres such as racing, fighting, and shooting games.

Moreover, by rendering at a slower speed than 1.0×, network latency compensation and interpolation algorithms may be more effective since shared environment 120 may require less frequent client updates within a given time period to maintain adequate game synchronization. Furthermore, since the rendering speed is slower, network latency periods may potentially last for longer times without negatively impacting the user experience, thereby reducing the impact of network congestion or long client node distances.

Examining FIG. 1 again, if client program 145a determines that a power up item has been collected, a corresponding message may then be sent to server program 115 over network 130. The transitions shown between 0:10 and 0:30 in rendering graph 260a of FIG. 2 might then be described within time scale transition 126. As previously discussed, time scale transition 126 might also be accessible by client program 145a and therefore also included within the message. In this case, client program 145a already has access to time scale 125 and may then proceed to render shared environment 120 with variations in time scale 125 accordingly. Once server program 115 receives the message regarding client 140a collecting the power up item, server program 115 may determine that the power up item effect corresponds to the slow-motion effect described by time scale transition 126. Server program 115 may then proceed to send a message to clients 140a-140c over network 130 to implement time scale transition 126 on time scale 125 when rendering shared environment 120. If client 140a has already started rendering, then the message might only be sent to clients 140b-140c. Client programs 145a-145c may then attempt to render shared environment 120 using time scale transition 126 synchronously. However, due to inherent latency introduced by network 130, perfect synchronization may not be feasible and an approximate synchronization may instead be achieved by, for example, using network latency compensation and interpolation algorithms, as well known in the art.

Thus, as shown in FIG. 2, if perfect synchronization is assumed, rendering graph 260b and rendering graph 260c will then be identical to rendering graph 260a. However, as described above, perfect synchronization may not be feasible due to inherent latency of network 130, and therefore rendering graphs 260a-260c may not be exactly identical. Furthermore, differing speeds between processors 141a-141c and other factors may cause further variations between rendering graphs 260a-260c. However, for simplicity, it is assumed that rendering graphs 260a-260c are largely identical, as shown in FIG. 2.

Clients 140a-140c may thus concurrently apply the "slow-motion" effect described in time scale transition 126 to time scale 125 of each client's rendering of shared environment 120, and then output each rendering to displays 150a-150c respectively. Thus, the users of clients 140a-140c may each experience approximately the same "slow-motion" effect from time 0:10 to time 0:30, as shown in FIG. 2. Thus, clients 140b-140c also receive the same "benefit" of the power up item as client 140a. While this may make intuitive sense for cooperative gameplay, sharing the "benefit" of the power up item may seem counterintuitive for competitive gameplay. However, shared environment 120 may be structured such that a "slow-motion" effect is an advantage for some clients and a disadvantage for other clients. For example, client 140b might be in a portion of shared environment 120 that is easier to navigate at 1.0× time scale rather than at 0.5× time scale, in which case the "slow-motion" effect is actually a penalty for client 140b. Time scale transitions might also be cumulative, for example if several clients trigger power up items at about the same time, or alternatively, newer time scale transitions may cancel the effects of older time scale transitions.

While the above example has been described in relation to a client collecting a power up item that decreases a time scale to 0.5× speed, there are also many other possibilities that can be implemented. Besides collecting a power up item, any other condition occurring in shared environment 120 could act as a triggering event, such as a client reaching a particular area or using a particular item, a game time matching a certain predetermined time period, or any other factor. Additionally or alternatively, an input received from an input device of clients 140a-140c might also act as the triggering event. For example, a user may click a pointing device such as a mouse, press a button or a key on a joystick or a keyboard, adjust a lever, or provide some other input. Furthermore, besides decreasing the time scale, the time scale transition may also increase the time scale, for example to 2.0× speed, causing shared environment 120 to appear in fast-motion. While rendering graphs 260a-260c show a gradual linear transition between time scales 1.0× and 0.5× that occurs for a predetermined period of 20 seconds, alternative embodiments might instantaneously change time scales. Furthermore, more complicated patterns of transitions such as logarithmic transitions, random fluctuations, complex waveforms, and other non-linear transitions may also be implemented.

FIG. 3 shows a flowchart describing the steps, according to one embodiment of the present invention, by which a processor of a server can facilitate variations in a time scale for a shared environment. Certain details and features have been left out of flowchart 300 that are apparent to a person of ordinary skill in the art. For example, a step may comprise one or more substeps or may involve specialized equipment or materials, as known in the art. While steps 310 through 340 indicated in flowchart 300 are sufficient to describe one embodiment of the present invention, other embodiments of the invention may utilize steps different from those shown in flowchart 300.

Referring to step 310 of flowchart 300 in FIG. 3 and diagram 100 of FIG. 1, step 310 of flowchart 300 comprises processor 111 of server 110 receiving a first message generated by client 140a in response to client 140a causing a variation in time scale 125 according to time scale transition 126. For example, client program 145a may detect an appropriate user input from an attached input device, such as a mouse click or a button press, to trigger the variation of time scale 125 according to time scale transition 126. Alternatively, a condition of shared environment 120 or some other factor may trigger the variation of time scale 125 according to time scale transition 126, such as an avatar of client 140a reaching a particular area or using a particular item, or a game time of shared environment 120 matching a certain predetermined time period, or any other factor.

Using the same power-up item example as previously discussed above, client program 145a might detect that client 140a has collected or otherwise triggered a power up item of shared environment 120, which causes client program 145a to apply a corresponding time scale transition 126 to time scale 125. Client program 145a may then generate the first message, which may include time scale transition 126 and other event data regarding the causation of time scale transition 126 on shared environment 120. This first message may then be sent over network 130 for receiving by server 110.

Referring to step 320 of flowchart 300 in FIG. 3 and diagram 100 of FIG. 1, step 320 of flowchart 300 comprises processor 111 of server 110 generating a second message using server program 115 to communicate time scale transition 126 caused by client 140a, as described in the first message received in step 310. As shown in FIG. 1, time scale transition 126 may already be accessible to server program 115, in which case step 320 may match event data described in the first message of step 310 with a corresponding time scale transition 126. For example, server program 115 may match time scale transition 126 to a condition of shared environment 120, such as a client triggering a power up object. In another embodiment, time scale transition 126 may already be included as part of the first message of step 310, in which case time scale transition 126 may be extracted from the first message. In yet another embodiment, time scale transition 126 may be dynamically generated or determined by server program 115 or client programs 145a-145c using one or more detailed factors. For example, in some embodiments, clients may have the ability to manually generate the composition of time scale transition 126, thus allowing clients to predict and create time scale transitions that can provide the greatest advantage for the client in shared environment 120. Thus, once server program 115 duly locates time scale transition 126, it may be then be included as part of the second message.

Referring to step 330 of flowchart 300 in FIG. 3 and diagram 100 of FIG. 1, step 330 of flowchart 300 comprises processor 111 of server 110 sending the second message from step 320 to client 140b in response to receiving the first message of step 310 so as to cause client 140b to render shared environment 120 approximately synchronously in accordance with time scale transition 126. As previously discussed, due to latency introduced by network 130, only an approximate synchronization may be achieved between clients 140a-140b when rendering shared environment 120 using latency compensation and interpolation techniques well known in the art. However, if perfect synchronization is assumed, then clients 140a-140b may each render shared environment 120 according to respective rendering graphs 260a-260b of FIG. 2. Step 330 may also be repeated for additional clients, such as client 140c, so that a plurality of clients can be synchronized, as in a multi-player online game.

Referring to step 340 of flowchart 300 in FIG. 3 and diagram 100 of FIG. 1, step 340 of flowchart 300 comprises processor 111 of server 110 causing the rendering of shared environment 120 in step 330 to be output to display 150b. For example, server program 115 may instruct client program 145b to also output the results of the rendering from step 330 to an attached display, or display 150b in FIG. 1. Client program 145b may then output the rendering to display 150b, using methods as commonly known in the art. Similar to step 330, step 340 may also be repeated for additional displays, such as display 145c. If client program 145a is not already outputting a render to display 150a, then step 340 may also be repeated for display 150a.

As is well known in the art, even though clients 140a-140c may all be rendering the same shared environment 120, they may each render shared environment 120 from a particular point of view unique for each client, and therefore the renders shown on displays 150a-150c may show different viewpoints of shared environment 120. However, even if the viewpoints are different, displays 150a-150c still show the same time-scale transitions or variations in time scale 125, as described by a single time scale transition 126. Thus, regardless of the particular client triggering time scale transition 126 on time scale 125, all clients may still render using the same time scale transition 126, as confirmed by rendering graphs 260a-260c of FIG. 2. Since this means that clients can suddenly trigger time scale transitions that affect other clients, an informational message might be shown on displays 150a-150c to avoid confusion. For example, continuing with the power up item example, a public message might be broadcast informing all users that client 140a triggered the power up item that is now causing the "slow-motion" effect implemented by time scale transition 126.

In this manner, variable time scaling effects can be implemented in the context of multi-player online games, allowing users to react to high-speed elements in a fun and stylish manner. This capability can be used in creative ways to provide more dramatic and faithful game adaptations of popular media, or to create unique original game designs. Furthermore, using time scaling factors slower than 1.0× speed may mitigate some of the negative effects of network latency, providing an improved user experience even in adverse network conditions.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A server facilitating variations in a time scale for a shared environment, the server comprising:
   a processor configured to:
      receive a first message generated by a first client of a plurality of clients in response to a variation in the time scale, for rendering the shared environment, caused by a user of the first client, wherein the variation in the time scale affects a game time for progressing the shared environment; and
      send a second message to a second client of the plurality of clients in response to receiving the first message to communicate the variation in the time scale caused by the first client, so as to cause the second client to render the shared environment approximately synchronously in accordance with the variation in the time scale.

2. The server of claim 1, wherein the rendering of the shared environment is further output to a display.

3. The server of claim 1, wherein the variation in the time scale comprises increasing or decreasing the time scale.

4. The server of claim 1, wherein the variation in the time scale occurs instantaneously.

5. The server of claim 1, wherein the variation in the time scale occurs for a predetermined period of time.

6. The server of claim 5, wherein the variation in the time scale comprises a pattern of transitions spanning the predetermined period of time.

7. The server of claim 1, wherein the user of the first client triggers an input device of the first client to cause the variation in the time scale.

8. The server of claim 1, wherein the processor is configured to receive the first message using a server program executing on the server, wherein the server program is configured to generate the second message in response to a condition of the shared environment.

9. The server of claim 8, wherein the condition comprises the first client of the plurality of clients triggering a power up object.

10. A method for use by a processor of a server for facilitating variations in a time scale for a shared environment, the method comprising:
receiving a first message generated by a first client of a plurality of clients in response to a variation in the time scale, for rendering the shared environment, caused by a user of the first client, wherein the variation in the time scale affects a game time for progressing the shared environment; and
sending a second message to a second client of the plurality of clients in response to receiving the first message to communicate the variation in the time scale caused by the first client, so as to cause the second client to render the shared environment approximately synchronously in accordance with the variation in the time scale.

11. The method of claim 10, wherein the rendering of the shared environment is further output to a display.

12. The method of claim 10, wherein the variation in the time scale comprises increasing or decreasing the time scale.

13. The method of claim 10, wherein the variation in the time scale occurs instantaneously.

14. The method of claim 10, wherein the variation in the time scale occurs for a predetermined period of time.

15. The method of claim 14, wherein the variation in the time scale comprises a pattern of transitions spanning the predetermined period of time.

16. The method of claim 10, wherein the user of the first client triggers an input device of the first client to cause the variation in the time scale.

17. The method of claim 10, wherein the receiving the first message uses a server program executing on a server, wherein the server program is configured to generate the second message in response to a condition of the shared environment.

18. A client device for varying a time scale in a shared environment, the client device comprising:
a display;
a processor configured to:
receive the shared environment from a server communicating with a plurality of client devices;
render the shared environment on the display;
receive a request from a user to cause a variation in the time scale for rendering the shared environment on the display, wherein the variation in the time scale affects a game time for progressing the shared environment;
continue rendering the shared environment on the display in accordance with the variation in the time scale; and
send a message to the server in response to the request, wherein the message includes the variation in the time scale so as to cause the plurality of client devices to render the shared environment approximately synchronously in accordance with the variation in the time scale.

19. The client device of claim 18, wherein the variation in the time scale comprises increasing or decreasing the time scale.

20. The client device of claim 18, wherein the variation in the time scale occurs for a predetermined period of time.

* * * * *